US012809505B2

(12) United States Patent
Matsushita

(10) Patent No.: US 12,809,505 B2
(45) Date of Patent: Nov. 24, 2026

(54) INFORMATION PROCESSING DEVICE, INFORMATION PROCESSING METHOD, AND NON-TRANSITORY COMPUTER READABLE MEDIUM FOR DISPLAYING SUMMARY WINDOW OF DATA

(71) Applicant: FUJIFILM Business Innovation Corp., Tokyo (JP)

(72) Inventor: Itsusei Matsushita, Yokohama (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 17/864,775

(22) Filed: Jul. 14, 2022

(65) Prior Publication Data

US 2023/0289046 A1 Sep. 14, 2023

(30) Foreign Application Priority Data

Mar. 11, 2022 (JP) ................................ 2022-037835

(51) Int. Cl.
*G06F 3/04845* (2022.01)
*G06F 3/0482* (2013.01)
*G06F 16/16* (2019.01)

(52) U.S. Cl.
CPC ........ *G06F 3/04845* (2013.01); *G06F 3/0482* (2013.01); *G06F 16/16* (2019.01)

(58) Field of Classification Search
CPC ..... G06F 3/04845; G06F 3/0482; G06F 16/16
See application file for complete search history.

(56) References Cited

U.S. PATENT DOCUMENTS

2002/0075324 A1* 6/2002 Combs .................... G06F 16/58 715/848
2003/0113040 A1* 6/2003 Nishiyama ............. G06F 16/54 382/305
2004/0056903 A1* 3/2004 Sakai .................... G06F 16/168 707/E17.01
2004/0117727 A1 6/2004 Wada
2007/0011622 A1* 1/2007 Chae .................. G06F 16/1734 715/764
2011/0320477 A1 12/2011 Nestler et al.
2012/0185800 A1* 7/2012 Hart ...................... G06F 3/0485 715/810

(Continued)

FOREIGN PATENT DOCUMENTS

JP 2013-25495 A 2/2013

OTHER PUBLICATIONS

Anonymous: "macos—View number of items in a folder in Icon view—Ask Different", May 13, 2020 (May 13, 2020), pp. 1-2, Retrieved from the Internet: URL:https://apple.stackexchange.com/questions/391063/view-number-of-tems-in-a-folder-in-icon-view.

(Continued)

*Primary Examiner* — Mahelet Shiberou
(74) *Attorney, Agent, or Firm* — Oliff PLC

(57) ABSTRACT

An information processing device includes a processor configured to: calculate a number of pieces of data in each of multiple states that the data may take from among data stored in a storage location; and execute a process for displaying the calculated number of pieces of data in each state in association with a representative image that represents the storage location.

10 Claims, 10 Drawing Sheets

(56) References Cited

U.S. PATENT DOCUMENTS

| | | | | |
|---|---|---|---|---|
| 2013/0132890 | A1* | 5/2013 | Masuda | G06F 16/58 715/784 |
| 2014/0006975 | A1* | 1/2014 | Oldham | G06Q 10/00 715/753 |
| 2014/0040747 | A1* | 2/2014 | Gardenfors | G06F 3/0482 715/728 |
| 2014/0310623 | A1* | 10/2014 | O'Connell, Jr. | G06F 16/958 715/764 |
| 2019/0294587 | A1 | 9/2019 | Prakash | |
| 2022/0374799 | A1* | 11/2022 | Yagi | G06Q 10/0637 |

OTHER PUBLICATIONS

Jun. 2, 2023 Extended Search Report issued in European Patent Application No. 22192278.4.
Oct. 28, 2025 Office Action issued in Japanese Patent Application No. 2022-037835.
Mar. 24, 2026 Office Action issued in Japanese Patent Application No. 2022-037835.

* cited by examiner

FIG. 6

| FILE NAME | STORAGE DATE AND TIME | OPEN DATE AND TIME | UPDATE DATE AND TIME | STATE |
|---|---|---|---|---|
| ABC | FEB 22 | FEB 22 13:15 | FEB 22 13:25 | UPDATED |
| DEF | FEB 22 11:15 | FEB 22 13:28 | — | OPENED |
| GHI | FEB 22 13:34 | — | — | UNOPENED |

| UNOPENED | OPENED | UPDATED |
|---|---|---|
| 4 | 2 | 1 |

INFORMATION PROCESSING DEVICE, INFORMATION PROCESSING METHOD, AND NON-TRANSITORY COMPUTER READABLE MEDIUM FOR DISPLAYING SUMMARY WINDOW OF DATA

CROSS-REFERENCE TO RELATED APPLICATIONS

This application is based on and claims priority under 35 USC 119 from Japanese Patent Application No. 2022-037835 filed Mar. 11, 2022.

BACKGROUND

(i) Technical Field

The present disclosure relates to an information processing device, an information processing method, and a non-transitory computer readable medium.

(ii) Related Art

There is a technology that displays a dynamically changing overlay icon on a main icon displayed on a screen of a graphical user interface (GUI).

For example, the method disclosed in Japanese Unexamined Patent Application Publication No. 2013-25495 includes (a) determining an icon overlay to be applied to a main icon of a target file on the basis of at least one user attribute or an end user and at least one file attribute or the target file, (b) applying the icon overlay to the main icon, and (c) displaying the main icon with the applied icon overlay in an end user system for the end user, wherein the icon overlay is configured to be different for at least two end users and to convey information about the target file to the end user, and the information is related to the end user.

As another example, on a UI screen of a smartphone, an overlay icon is displayed on an icon representing an application, the overlay icon indicating whether a notification exists for the application or the number of notifications. Such an overlay icon is also referred to as a badge.

SUMMARY

Aspects of non-limiting embodiments of the present disclosure relate to providing more information about data stored in a storage location compared to a method for displaying, in association with a representative image that indicates the storage location, an indication of whether notification data exists or the number of the notification data for the storage location.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to: calculate a number of pieces of data in each of a plurality of states that the data may take from among data stored in a storage location; and execute a process for displaying the calculated number of pieces of data in each state in association with a representative image that represents the storage location.

BRIEF DESCRIPTION OF THE DRAWINGS

An exemplary embodiment of the present disclosure will be described in detail based on the following figures, wherein:

FIG. 6 is a diagram illustrating an example of a file list recorded in a shared folder;

DETAILED DESCRIPTION

Hereinafter, an embodiment for carrying out the present disclosure (hereinafter designated the exemplary embodiment) will be described.

First, the terms used in this specification will be described.

A "screen" refers to a screen displayed on a display device attached to an information processing device (including a personal computer, a thin client terminal, a smartphone, a tablet, or the like). The desktop screen of a personal computer is a typical example, but other types of screen such as a window displayed on a desktop screen or the home screen of a smartphone are also examples of a "screen" in this specification.

A "representative image" refers to an image that indicates (that is, represents) an object of some kind, and is an image which is displayed on a screen and which functions as a user interface (UI) component. Herein, an object may be a file, a folder (that is, a directory), a process (such as an application program or a program written in a macro or script), or the like. For example, an icon that indicates a file or an application is an example of a representative image. In some cases, a representative image is a still image, and in other cases, the representative image is a dynamically changing image, for example, an image of a clock face which is displayed by a clock gadget and which changes depending on the time, or an icon that changes color depending on the number of stored documents). A representative image is a UI component and receives an operation from the user.

Figure 1:
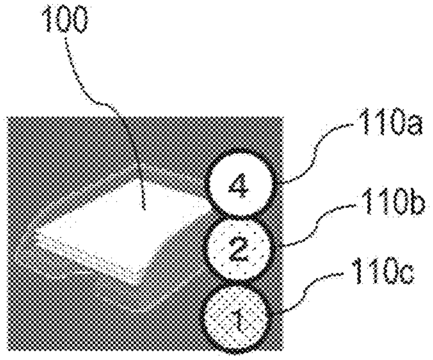
FIG. 1 is a diagram illustrating a tray icon and an overlay icon.

FIG. 1 illustrates a tray icon 100 as one example of a representative image indicating a data storage location in the exemplary embodiment. The tray icon 100 is an con that indicates a shared folder shared by multiple users for a specific task. Files that may be shared among the users are stored in the shared folder. In other words, the shared folder is likened to a document tray where exchanged documents are placed in the real world, and uses the tray icon 100 resembling the shape of a document tray as a desktop metaphor for shared files. Here, a file is an example of data, and a shared folder is an example or a storage location where data is stored. The multiple users carry out the specific task by exchanging files via the shared folder. The tray icon 100 is installed in a terminal such as a personal computer (PC) operated by each user with access to the shared folder, and is displayed on a prescribed screen, such as a desktop screen, of the terminal.

If a user performs an operation (for example, a double-click) for opening the tray icon 100 displayed on the screen, a list of the files in the shared folder is displayed. In this list of files, a file state (described later) is displayed for each file. The file state is expressed by the appearance of an icon indicating a file, a character string indicating a name for the state, or the like. The appearance of an icon referred to herein includes properties such as the shape, color, and display density or brightness of the icon.

Three overlay icons 110*a*, 110*b*, and 110*c* are displayed on, for example, the right side of a picture illustrating the tray of the tray icon 100. The three overlay icons 110*a*, 110*b*, and 110*c* respectively correspond to three states that a file may take, and the number of files in each state from among the files in the shared folder. Hereinafter, the overlay icons 110*a* to 110*c* will be collectively referred to as the overlay icon 110 when not being, distinguished individually.

In the example of FIG. 1, for instance, consider a situation where the shared folder is used to carry out a task in which a staff member belonging to a certain department creates a file of a document to be submitted to a different department, the head of the department views and updates the file, and the staff member retrieves and sends the updated file to the destination department. In this example, the tray icon 100 indicating the shared folder is displayed on a screen on each of a terminal operated by the staff member and a terminal operated by the department head.

In this example, an operation by which the staff member stores the created document file in the shared folder, an operation by which the head of the department view the file in the shared folder, and an operation by which the head of the department updates the file in the shared folder are performed. Consequently, the file the shared folder may take three possible states: an "unopened" state in which the file has been stored by the staff member but not yet viewed by the department head, an "opened" state in which the file has been viewed by the department head but not yet updated, and an "updated" state in which the file has been updated by the department head. The three overlay icons 110*a*, 110*b*, and 110*c* display the number of files in each of the three states from among the files in the shared folder. In the example illustrated in the diagram, the overlay icon 110*a* displays the number of files in the "unopened" state, the overlay icon 110*b* displays the number of files in the "opened" state, and the overlay icon 110*c* displays the number of files in the "updated" state. Note that when the staff member takes an "updated" file out of the shared folder to send the file to the destination department, the file is removed from the shared folder.

The system according to the exemplary embodiment uses the overlay icons 110*a* to 110*c* to display, for each state that a file may take, the number of files in each state from among the files in the shared folder indicated by the tray icon 100. In the example illustrated in the diagram, the overlay icon 110 is circular, with a size that is smaller than the tray icon 100 indicating the object (that is, a shared file). Additionally, the number of files in the state corresponding to the overlay icon 110 is displayed inside the circle of the overlay icon 110. The overlay icons 110*a*, 110*b*, and 110*c* have different appearances so as to be mutually distinguishable. The appearance referred to herein includes properties such as the color or the icon or numeral, the display density or brightness of the icon or numeral, and the shape of the icon. For each file state, the appearance of the overlay icon 110 indicating the file (s) in that state is set. If the shared folder does not contain any files in a certain state, the overlay icon 110 corresponding to that state may be hidden, or may be displayed with the numeral "0" inside.

In the example of FIG. 1, there are three states that files in the shared folder may take, but this is merely an example. Files may also take two possible states, or four or more possible states. The number of overlay icons 110 displayed in association with the tray icon 100 is, at a maximum, the number of states that the files may take.

In the exemplary embodiment, since the overlay icon 110 is displayed, the user can know how many files in each state are in the shared folder without opening the tray icon 100.

In addition, the system according to the exemplary embodiment provides a summary window in response to a prescribed operation by the user. The summary window is a window that displays an image illustrating an overview of a file group saved in the shared folder indicated by the tray icon 100. More specifically, the summary window displays an image in which icons indicating the files in the shared folder are sorted and arranged according to the state of each file.

Figure 2:
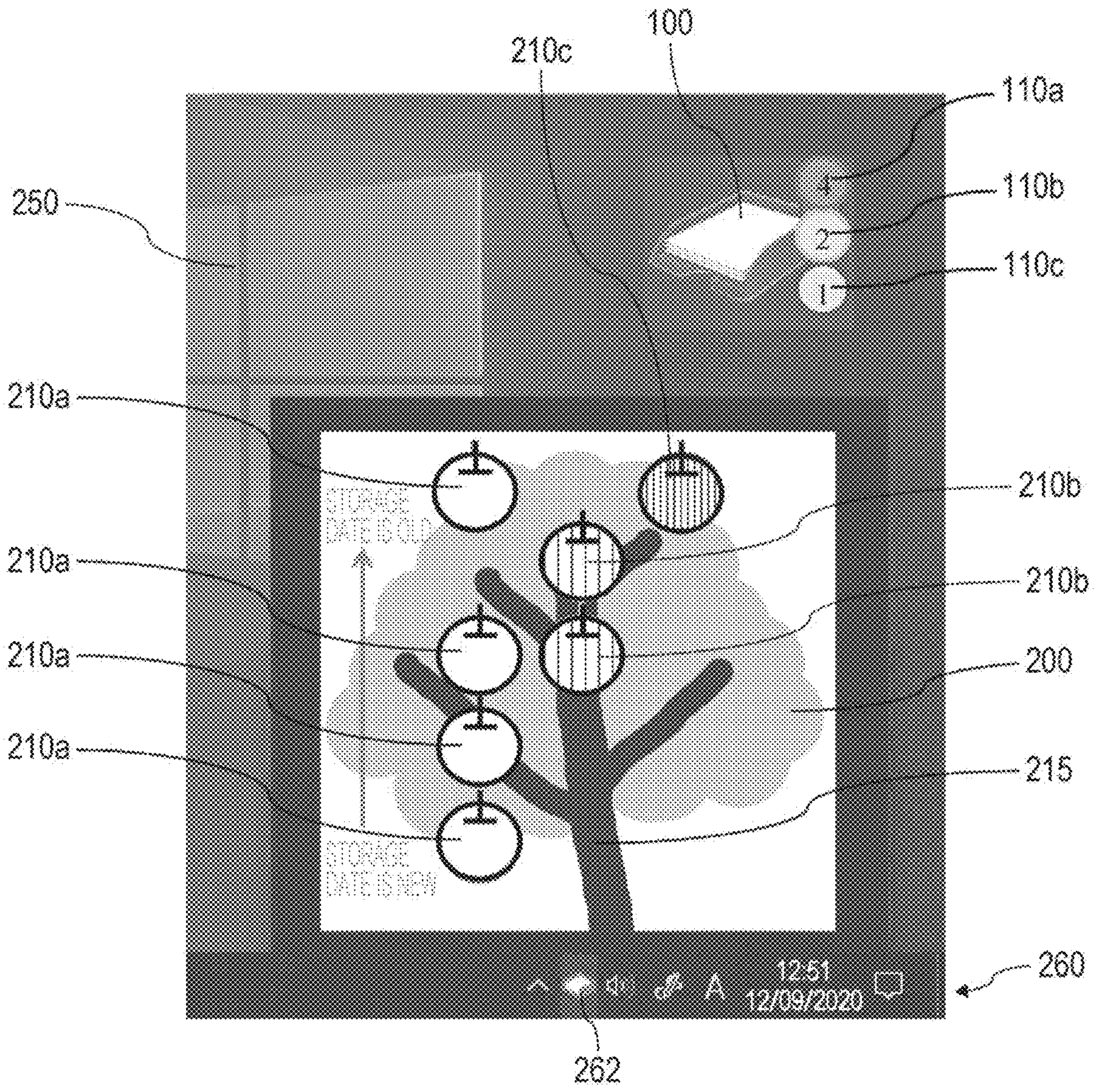
FIG. 2 is a diagram illustrating an example of a summary window.

FIG. 2 illustrates an example of a summary window 200. In the summary window 200 illustrated as an example in FIG. 2, files in a shared folder are expressed by icons 210*a*, 210*b*, and 210*c* (hereinafter collectively referred to as the "icon 210" when not being distinguished) in the shape of a fruit. A background illustration of the icon 210 in the shape of a fruit is a picture indicating a tree 215.

The icons 210*a*, 210*b*, and 210*c* have mutually different appearances (in terms of color, display density or brightness, or a pattern inside the icons, for example). The individual appearances correspond to the states of the files. The icon 210*a* indicates the "unopened" state, the icon 210*b* indicates the "opened" state, and the icon 210*c* indicates the "updated" state. By making the appearances of the icons 210*a*, 210*b*, and 210*c* corresponding to respective states be the same as the appearances of the overlay cons 110*a*, 110*b*, and 110*c* corresponding to the same states, the correspondence relationship between the two types of icons may be grasped more easily.

The state of a file in the shared folder changes sequentially from "unopened", to "opened", to "updated". In other words, the state of a file illustrated as an example herein indicates the progress of a workflow in relation to the file. Accordingly, for example, the colors of the icons 210*a*, 210*b*, and 210*c* in the shape of a fruit may change to riper colors as the state progresses further. For example, the color of the icon 210*a* indicating an initial state may be set to green to indicate an unripe state, the color of the icon 210*b* indicating the next state may be set to yellow, and the color of the icon 210_c_ indicating the next state after that may be set to red to indicate a fully ripened state.

Also, in the summary window 200 illustrated as an example, the icons 210_a_, 210_b_, or 210_c_ for corresponding files in the same state are aligned and displayed in a single column. In this example, there are three states and therefore three columns, and the three columns are arrayed from left to right in order of the state progression. That is to say, the horizontal axis of the summary window 200 indicates the state progression of the files. The icons 210_a_ indicating files in the initial state are aligned vertically in the column farthest on the left. Also, the icons 210_b_ corresponding to the next state are aligned vertically in the middle column, and the icons 210_c_ corresponding to the next state after that are aligned vertically in the column farthest on the right.

In addition, the vertical axis of the summary window 200 indicates the recency of the date (referred to as the "storage date") when a file was stored in the shared folder. Files corresponding to icons 210 positioned lower have newer storage dates, and conversely, files indicated by icons positioned higher have older storage dates. It is conceivable that the longer a file has remained in the shared folder, the more the file demands attention. Accordingly, the icon 210 corresponding to such a file is placed higher on the picture of the tree 215 so as to be conspicuous.

In the example illustrated in the diagram, the vertical axis of the icon arrangement represents the oldness (or newness) of the storage dates of the files, but this is merely one example. The vertical axis may also be used to represent another temporal attribute value of the files. Such an attribute may be the modification date or the number of days or hours that have elapsed since the file changed to its current state, for example.

In this way, the summary window 200 is a display that indicates a distribution of files in the shared folder using a coordinate system that takes the state progression as the horizontal axis and the oldness of the storage date as the vertical axis.

In on example, if the tray icon 100 is enabled, an operating system (OS) of the terminal operated by the user displays the tray icon 100 on a desktop screen 250. Also, in this case, the OS displays an icon 262 corresponding to the tray icon 100 in a task tray 260 displayed on the bottom edge, for example, of the desktop screen 250. If the user performs a prescribed operation (for example, a single-click) on the icon 262, the summary window 200 is displayed above the task tray 260, for example. Moreover, if the user performs a different operation (for example, a double-click) on the icon 262, the OS may display a file list screen of the inside of the shared folder via the file system. Also, the user may be able to preconfigure a setting for designating whether the summary window 200 or the file list screen of the file system is to be displayed when a specific operation is performed on the icon 262. In this case, the user performs the specific operation on the icon 262, either the summary window 200 or the file list screen is displayed, in accordance with the setting.

Additionally, a menu item indicating the display of a summary window may be included in a context menu corresponding to the tray icon 100. In this case, the user performs a prescribed operation, such as a right-click, on the tray icon 100 to call a context menu related to the tray icon 100, and gives an instruction for displaying the summary window 200 from the context menu.

The icon 210 indicating a file is linked to a file shared in the shared folder. If the user performs an "open file" operation, such as a double-click, on the icon 210, the OS acquires the file corresponding to the icon from the shared folder, and opens and displays the file on the screen. Additionally, if the user performs a prescribed operation different from an "open operation" on the icon 210 indicating a file, such as an operation causing a cursor to be positioned on top of the icon (also referred to as a hover operation), the OS may display attribute information about the file corresponding to the icon 210.

Figure 3:
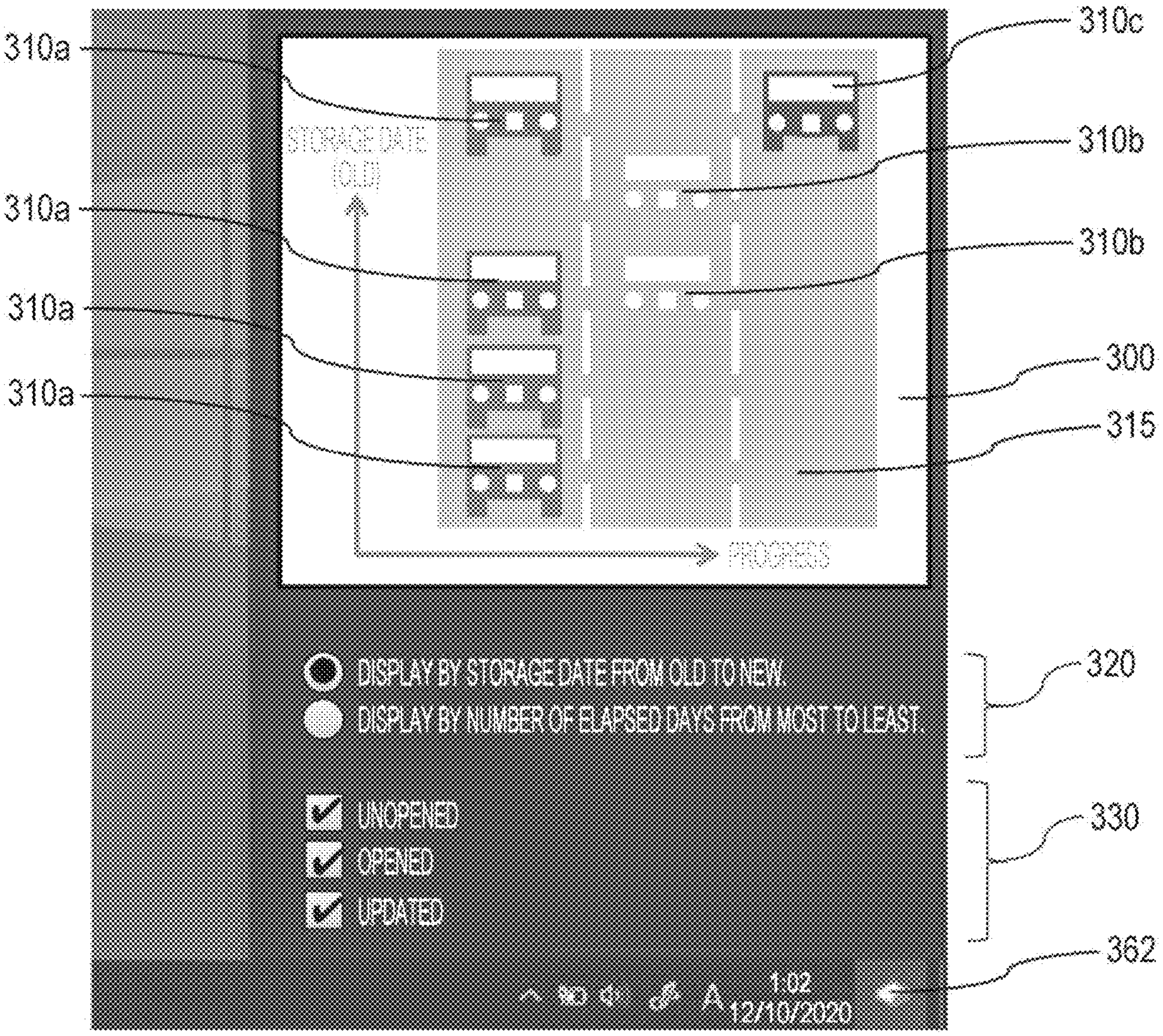
FIG. 3 is a diagram illustrating another example of a summary window.

FIG. 3 illustrates another example of a summary window. The summary window 300 illustrated as an example in FIG. 3 uses the metaphor of a road and cars instead of a tree and fruit. Namely, files in the shared folder are expressed as icons 310_a_, 310_b_, and 310_c_ (hereinafter collectively referred to as the "icon 310" when not being distinguished) in the shape of a car and placed on a background illustration indicating a three-lane road 315. The icons 310_a_, 310_b_, and 310_c_ indicate the "unopened", "opened", and "updated" states, respectively. The icons 310_a_, 310_b_, or 310_c_ indicating files in the same state are arranged in the same lane. Each of the icons 310_a_, 310_b_, and 310_c_ is displayed with an appearance (for example, a color) that corresponds to the state of the file represented by the icon.

The horizontal axis of the summary window 300, or in other words the direction in which the lanes are arranged, indicates the order in which the states of the files progress from left to right. That is to say, the three lanes respectively correspond to the "unopened", "opened", and "updated" states in order from the left. Also, the vertical axis of the summary window 300, or in other words the direction in which the road 315 runs, indicates the order of a temporal attribute value of the files. In the example illustrated in the diagram, the vertical axis indicates the oldness of the storage date, such that an icon 310 positioned higher indicates that the file corresponding to the icon 310 has an older storage date.

Below the background illustration of the picture of the road 315 in the summary window 300, there is a field 320 for selecting the attribute of the vertical axis and a field 330 for specifying the states to be displayed.

In the example of FIG. 3, a first option to "display by storage date from oldest to newest" and a second option to "display by number of elapsed days from most to least" are displayed in the field 320. The first option is an arrangement method in which the icons 310 of files with older storage dates appear higher on the vertical axis. The second option is an arrangement method in which the icons 310 of files with a greater number of elapsed days since changing to their current state appear higher on the vertical axis. These two options are mutually exclusive; if one is selected, the other is deselected. A radio button is displayed to the left of each option. If the user presses one of the radio buttons, the option corresponding to that radio button is selected. The example illustrated in the diagram corresponds to the case where the first option has been selected.

In the field 330, options for the three states of unopened, "opened", and "updated" are indicated. One or more of these three states may be selected at the same time. The user performs an operation such as a click to input a check mark into a check mark to the left of the desired state(s) to be displayed. In the example illustrated in the diagram, all three states are selected. The icons 310 representing the files in the selected state(s) are displayed on the background illustration indicating a road, whereas the icons 310 representing the files in the non-selected state(s) are not displayed.

The options in each of the fields 320 and 330 illustrated in the diagram are merely examples. The fields 320 and 330 may each contain options other than the ones illustrated, and do not have to contain the illustrated options.

The summary window 300 illustrated as an example is displayed when triggered by the user performing a prescribed operation on an icon 362 (an icon corresponding to the tray icon 100) placed in a task tray, for example.

Figure 4:
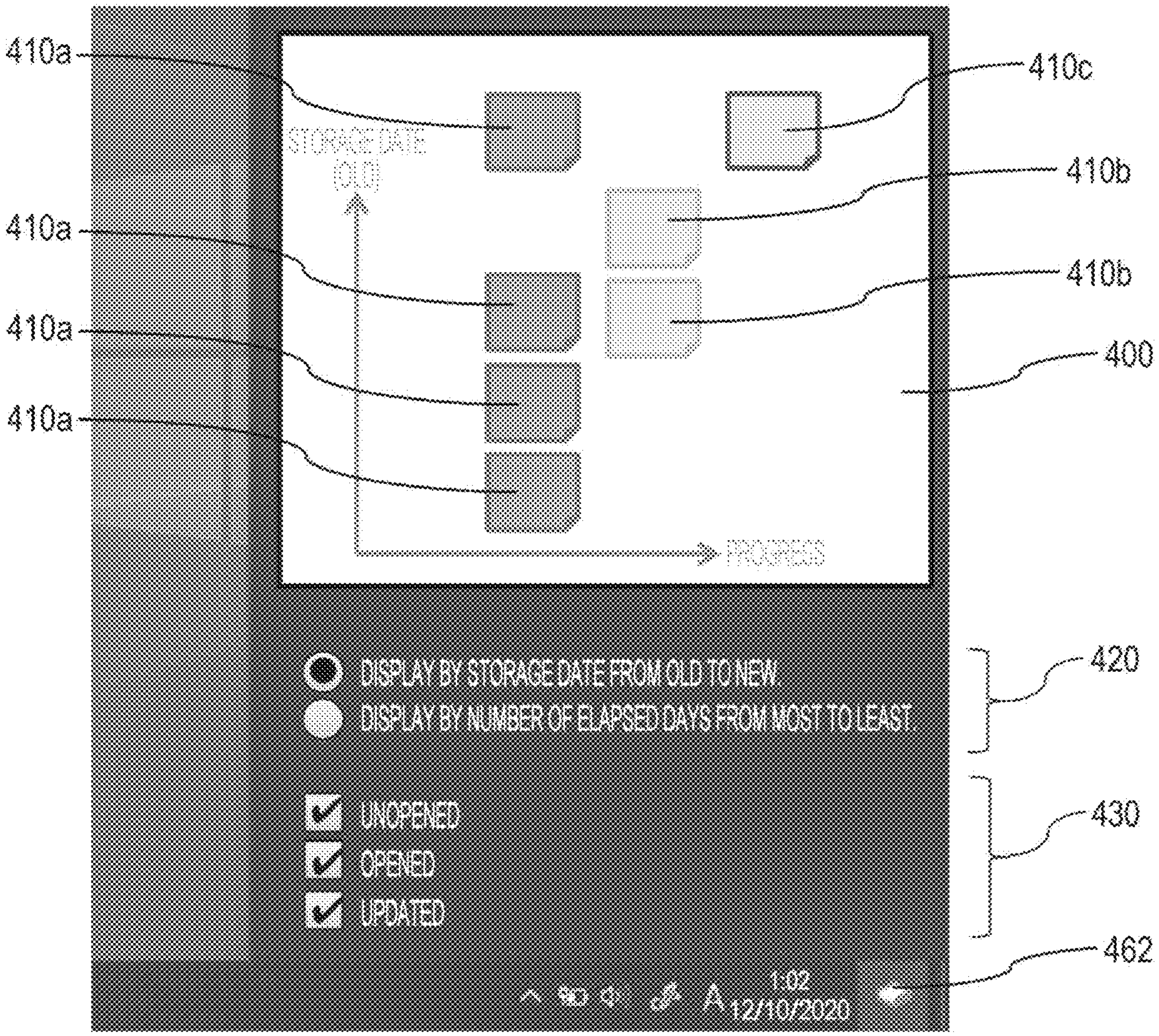
FIG. 4 is a diagram illustrating yet another example of a summary window.

Note that input fields similar to the fields 320 and 330 may also be provided in the summary window 200 of the format illustrated as an example in FIG. 2, FIG. 4 illustrates yet another example of a summary window. In this example, files are expressed by icons 410*a*, 410*b*, and 410*c* (hereinafter collectively referred to as the "icon 410" when not being distinguished) in a shape resembling a paper document. The icons 410*a*, 410*b*, and 410*c* Indicate the "unopened", "opened", and "updated" states, respectively. The horizontal axis of the summary window 400 indicates the order in which the states of the files progress from left to right. Icons representing files in the same state are aligned in the same column. The leftmost column corresponds to "unopened", the middle column to "opened", and the rightmost column to "updated". Each of the icons 410*a*, 410*b*, and 410*c* is displayed with an appearance (for example, a color) that corresponds to the state of the file represented by the icon 410. Also, the vertical axis of the summary window 400 indicates the order of a temporal attribute (for example, the storage date) value of the files. In the lower part of the summary window 400, there is a field 420 for selecting the attribute of the vertical axis and a field 430 for specifying the states to be displayed. The fields 420 and 430 are similar to the fields 320 and 330 in the example of FIG. 3.

The summary window 400 illustrated as an example is displayed when triggered by the user performing a prescribed operation on an icon 462 (corresponding to the tray icon 100) placed in a task tray, for example.

Tice icons 210, 310, and 410 displayed in the summary windows 200, 300, and 400 are associated with respectively corresponding files. If an "open" operation such as a double-click is performed on the icon 210, 310, or 410, the terminal opens and displays the corresponding file on the screen. Also, if a prescribed operation such as a mouse hover (that is, positioning the cursor on top of an icon) is performed on the icon 210, 310, or 410, the terminal displays information such as one or more prescribed attributes (for example, the file name, storage date, and last modified date) of the corresponding file.

If a staff member sees that from the overlay icon 110*a* that there are many unopened files, opens the summary window 200 or the like and recognizes that very old files are unopened, the staff member encourages the department head to check the files. As another example, if the department head looks at the summary window 200 or the like and learns that an updated file has not been taken out of the shared folder, the department head encourages the staff member to retrieve and pass on the file to the next department.

An example of a system configuration for achieving the screen display described above is illustrated in FIG. 5.

In this system, a shared folder 10 is the shared folder indicated by the tray icon 100 described above. A file storage area 12 and a file information recording area 14 are provided in the shared folder 10. The files themselves are stored in the file storage area 12. In the file information recording area 14, management information about the file group stored in the file storage area 12 is recorded. The management information includes a file list and an aggregate result. The file list is a list of attribute information about each file stored in the file storage area 12. An example of the file list is illustrated in FIG. 6.

The file list illustrated as an example in FIG. 6 includes the five attributes of a file name, a storage date and time, an open date and time, an update date and time, and a state for each file stored in the file storage area 12. The storage date and time is the date and time when the file was stored in the file storage area 12. The open date and time is the date and time when the file stored in the file storage area 12 was first opened (that is, viewed). The update date and time is the date and time when the file stored in the file storage area 12 was last updated (from the present point in time). The update date and time is extractable from attribute information for files in a general format used in a typical OS. The state is the current state of the file. In the examples of FIGS. 1 to 4 described above, there are three file states: "unopened", "opened", and "updated".

In the example of FIG. 6, the file "GHI" is in the "unopened" state, or in other words, is stored in the shared folder 10 but has not been opened or updated. Consequently, a value for the storage date and time is recorded for the file "GHI" in the file list, but the fields for the open date and time and the update date and time are empty. Also, the file "DEF" is in the "opened" state, and therefore values for the storage date and time and the open date and time are recorded in the file list, but a value for the update date and time is not recorded. Also, the file "ABC" is in the "updated" state, and values for the storage date and time, the open date and time, and the update date and time are recorded in the file list.

The file list illustrated in FIG. 6 is merely one example. For instance, in the case of using files in a specific format allowing for a greater variety of attribute information to be recorded for files compared to files in a general format, even more items may be included in the file list. For example, in the case of a file format allowing for the dates and times when the file was processed in each step of a workflow to be recorded as attributes of the file in each stage, one or more of the dates and times when the file was processed in each of the steps may be included in the file list.

Figures 8, 9:
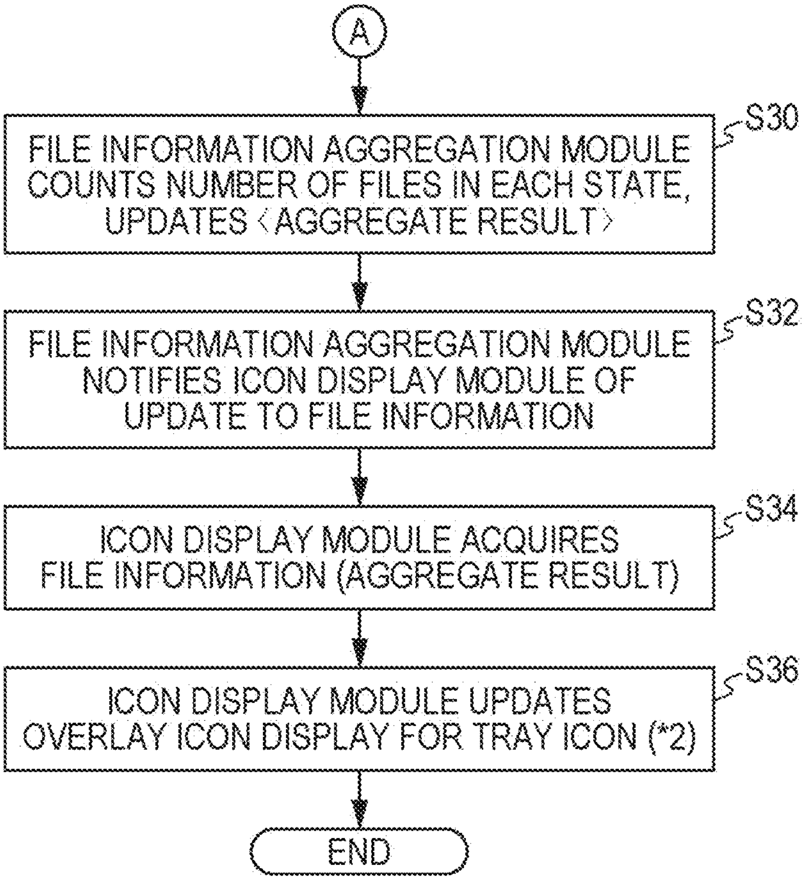
FIG. 8 is a diagram illustrating an example of a processing procedure subsequent to the processing procedure in FIG. 7.
FIG. 9 is a diagram illustrating an example of an aggregate result recorded in a shared folder.

The aggregate result recorded in the file information recording area 14 is information about the aggregate number of files in each state in the shared folder 10 (see FIG. 9).

A folder monitoring module 16 monitors user operations on the shared folder 10. The operations to be monitored are, for example, the storing of a file to the shared folder 10, the viewing (that is, opening) of a file in the shared folder 10, and the updating of a file in the shared folder 10.

A file information aggregation module 18 uses information obtained from the monitoring by the folder monitoring module 16 to update the file list and the aggregate result in the file information recording area 14.

The three modules of the shared folder 10 the folder monitoring module 16, and the file information aggregation module 18 described above are function modules disposed on the server side. The three modules are implemented on a single server or in a cloud service.

In contrast, an icon display module 20, a summary window display module 22, and a user folder 24 described below are function modules implemented in a terminal (for example, a PC) operated by each user.

The icon display module 20 executes a process for displaying the tray icon 100 and the overlay icon 110 on the screen. The summary window display module 22 executes a process for displaying the summary window.

Figure 5:
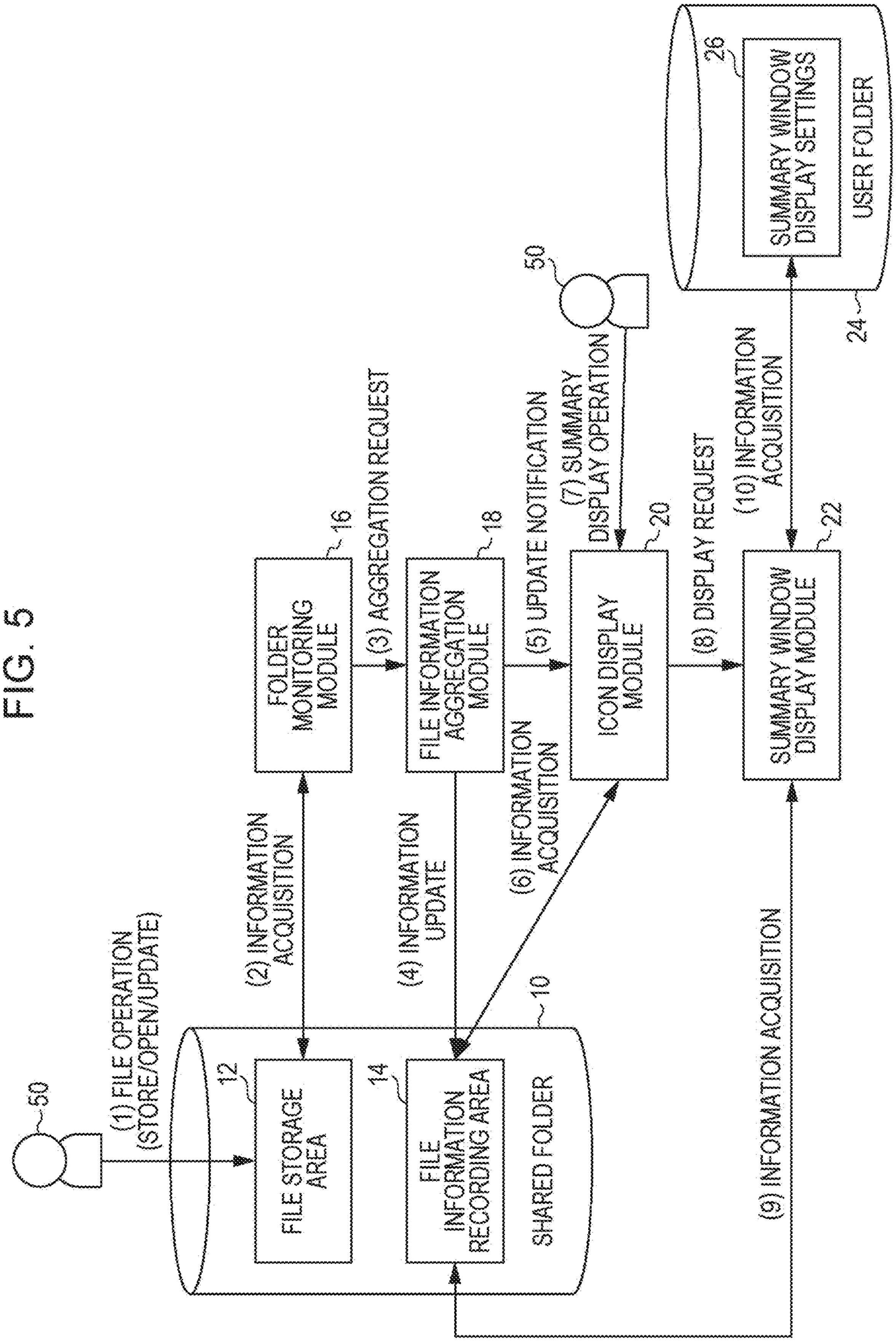
FIG. 5 is a diagram illustrating an example of a functional configuration of a system according to an exemplary embodiment.

The user folder 24 is a folder for saving a file containing settings information referred to as the summary window display settings 26. The summary window display settings 26 are settings information related to the di play layout and display content of the summary window. The setting for the display layout of the summary window is information indicating which of the "tree" format illustrated in FIG. 2, the "road" format illustrated in FIG. 3, or the simple format with a plain background illustrated in FIG. 5 is to be used as the display layout, for example. Note that the display layout of the summary window is not limited to what is illustrated in FIGS. 2 to 4. Also, the settings for the display content of the summary window include a setting indicating the sorting method on the vertical axis of the summary window and a setting indicating which states correspond to the files to be displayed as icons. The sorting method on the vertical axis indicates which temporal attribute value is to be used to sort, in ascending or descending order, the icons of files along the vertical axis of the summary window, as illustrated in the fields 320 and 420 of FIGS. 3 and 4. Also, the setting indicating which states correspond to the files to be displayed as icons is settings information indicating whether or not to display each of the "unopened", "opened", and "updated" states, for example. The setting information is determined according to user input into the fields 330 and 430 in FIGS. 3 and 4, for example.

the summary window display module 22 displays the summary window 200, 300, or 400 according to the summary window display settings 26.

Figure 7:
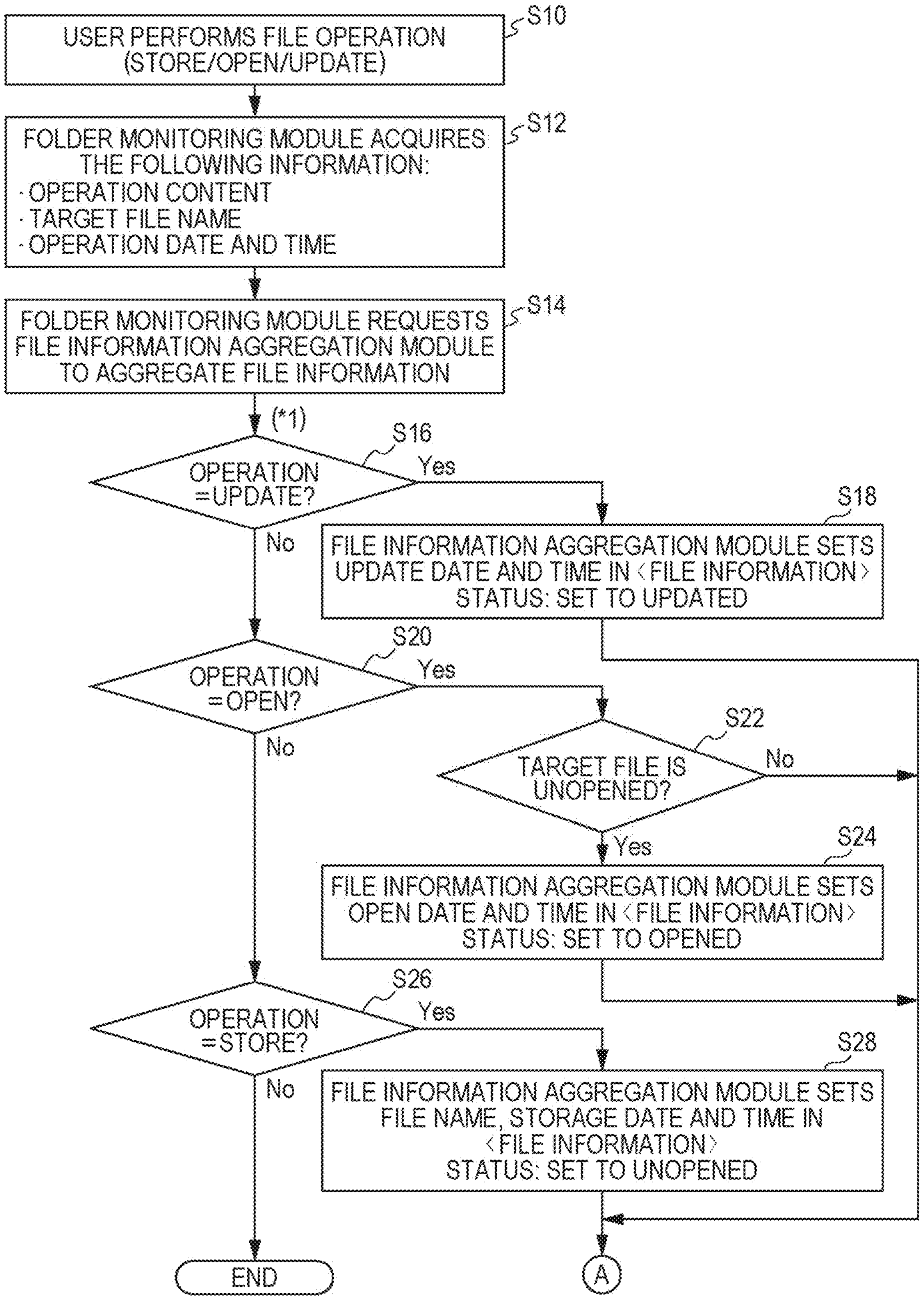
FIG. 7 is a diagram illustrating an example of a processing procedure in a system when a user performs an operation on a shared folder.

Hereinafter, a processing procedure executed by the system illustrated in FIG. 5 will be described with reference to the flowcharts in FIGS. 7 and 8. In the following description, the notation indicating a numeral and a processing content heading in parentheses, such as "(1: File Operation)", indicates a process denoted by a numeral in parentheses such as "(1)" in FIG. 5. Also, a numeral prefixed by the letter S, such as "S10", is a numeral indicating a step in a flowchart.

(1: File Operation) The user performs an operation on the shared folder 10. The operation performed by the user includes storing a file to the shared folder 10, and opening and updating a file in the shared folder 10 (S10). In terms of the case example described above, the user who stores C file in the shared folder 10 is the staff member who has created the file (for example, a document to be checked by the department head). In contrast, the user who opens and updates a file stored in the shared folder 10 is the department head responsible for checking the file.

(2: information Acquisition) The folder monitoring module 16 detects that an operation like the above has been performed and acquires information related to the operation from the shared folder 10 or the OS that manages the shared folder 10 (S12). The information acquired at this time includes operation content, a target file name, an operation date and time, and the like. The operation content indicates the type of operation performed at the time, and is one of storing, opening, or updating, for example. The target file name is the name of the file on which the operation is performed.

(3: Aggregation Request) Next, the folder monitoring module 16 requests the aggregation or file information from the file information aggregation module 18 (S14).

(4: Information Update) in response to the request, the file information aggregation module 18 updates the file list and the aggregate result in the file information recording area 14 to reflect the information about the operation detected in S12. More specifically, the updating process is S16 to S28 in FIGS. 7 and S30 in FIG. 8.

In other words, the file information aggregation module 18 determines whether or not the operation detected in S12 is an "update" operation (S16). If the determination result is Yes, the file information aggregation module 18 searches the file list (see FIG. 6) using the target file name acquired in S12 as a search key, and specifies the record containing the target file name as the "file name". The record is management information about target file of the operation. Note that in S22 described later, the management information about the target file is specified similarly. After the specification, the file information aggregation module 18 writes the value of the operation date and time acquired in S12 to the field of the update date and time in the specified record, and also writes a value indicating "updated" to the state field in the record (S18). Immediately before the above values are written, a value indicating "opened" is written in the state field in the record, but in S18, the "opened" value is overwritten by the "updated" value. This causes the state of the file to advance to "updated". After S18, the process proceeds to S30 illustrated in FIG. 8.

If the determination result in S16 is No, the file information aggregation module 18 determines whether or not the operation detected in S12 is an "open" operation (S20). If the determination result is Yes, the file information aggregation module 18 checks the value of the state of the target file in the file list and determines whether or not the value is "unopened" (S22). If the determination result is Yes, the file information aggregation module 18 writes the value of the operation date and time acquired in S12 to the field of the open date and time in the specified record, and also writes a value indicating "opened" to the state field in the record (S24). This causes the state of the file to advance from "unopened" to "opened". If the determination result in S22 is No, that is, if the state of the target value is "opened" or "updated", the file information aggregation module 18 proceeds to S30 without updating the information in the file information recording area 14. In this case, a user (for example, the department head) has simply reopened (that is, viewed) a file that was already opened or updated, and therefore the state of the file does not change.

If the determination result in S20 is No, the file information aggregation module 18 determines whether or not the operation detected in S12 is a "store" operation (S26). If the determination result is Yes, the file information aggregation module 18 adds a record to the file list, the record containing the target file name acquired in S12 as the "file name". Additionally, the value of the operation date and time acquired in S12 is written to the field of the storage date and time in the added record, and a value indicating "unopened" is written to the state field in the record (S28). After that, the process proceeds to S30.

If the determination result in S26 is No, the operation performed by the user in S10 is none of storing, opening, or updating. In this case, the operation is outside the purview of the file information aggregation module 18, and therefore the file information aggregation module 18 does not perform any process. Therefore, the sequential processing procedure related to the operation in S10 ends.

Next, a continuation of the processes described above will be described with reference to FIGS. 5 to 8.

The file information aggregation module 18 counts the number of files in each state in the file list, and updates the aggregate result according to the result of the count (S30).

An example of aggregate result data is illustrated in FIG. 9. In this example, the aggregate result includes the number of files in each of the unopened, opened, and updated states. In S30, the values of the numbers of files in each state are updated to values indicating the result of the count.

(5: Update Notification) Next, the file information aggregation module 18 notifies the icon display module 20 installed in the terminal of each user (for example, the staff member and the department head) that the file information has been updated (S32).

(6: Information Acquisition) The icon display module 20 receiving the notification acquires the aggregate result recorded in the file information recording area 14 of the shared folder 10 (S34).

Additionally, the icon display module 20 updates the display of each overlay icon 110 attached to the tray icon 100 displayed on the screen of the terminal according to the information in the acquired aggregate result (S36). In other words, the numerical values in the overlay icons 110 are updated to the most recent values for each state indicated by the aggregate result. This ends the series of processes triggered by the operation performed on the shared folder 10 by the user (S10).

Figure 10:
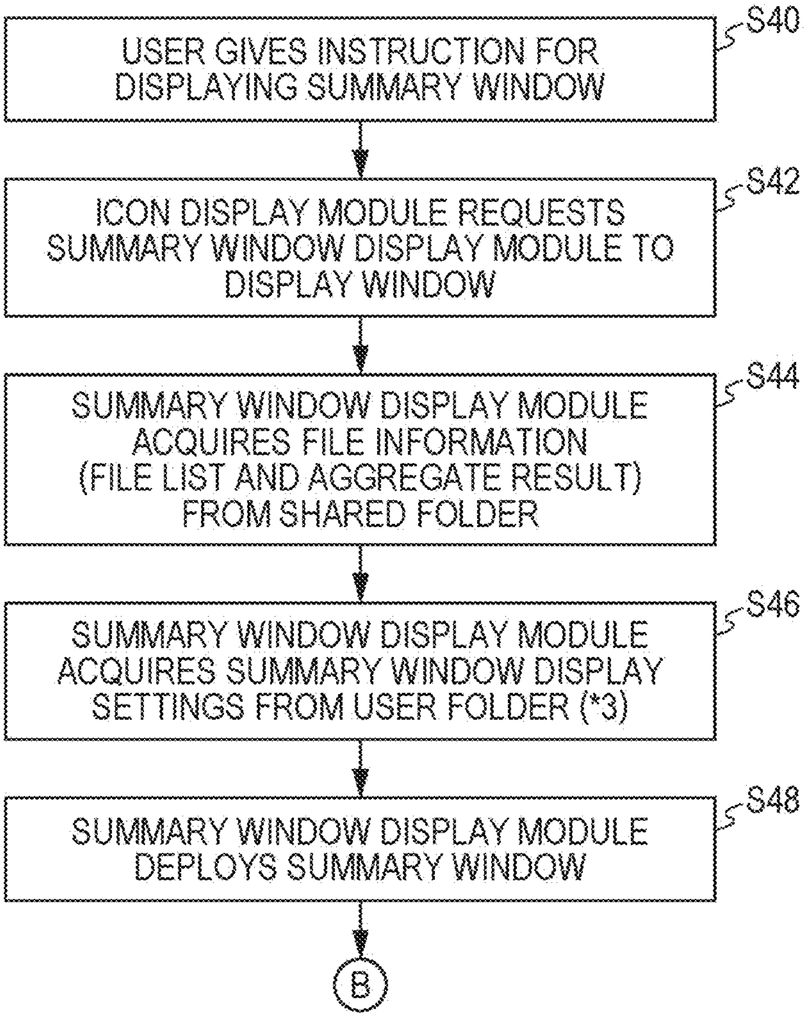
FIG. 10 is a diagram illustrating an example of a processing procedure in a system when a user gives an instruction to display a summary window.
Figure 11:
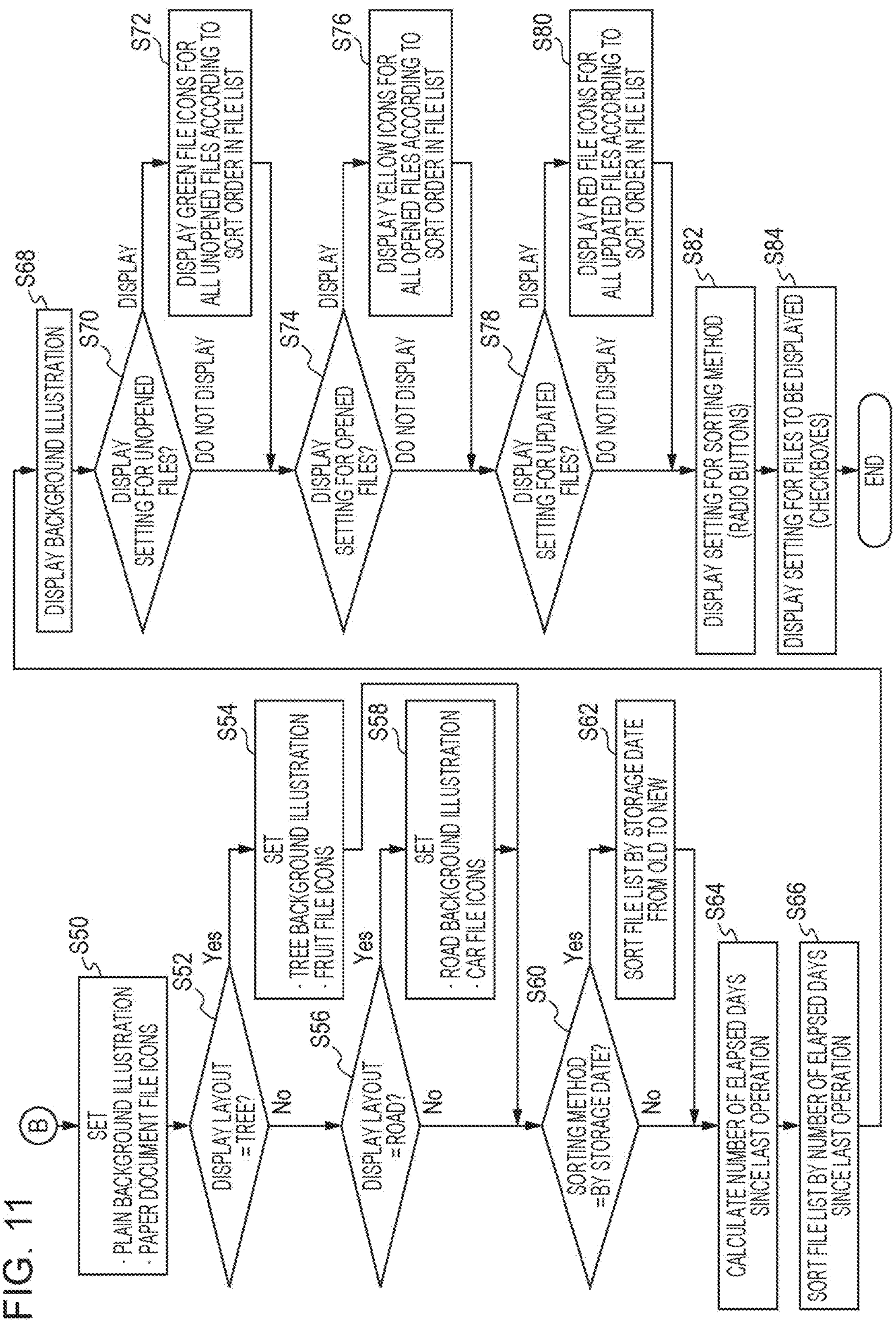
FIG. 11 is a diagram illustrating an example of a processing procedure subsequent to the processing procedure in FIG. 10.

FIGS. 10 and 11 illustrate an example of a processing procedure in the case where a user performs an operation, such as a click, on the icon 262 or the like to give an instruction for displaying the summary window 200, 300, or 400. Hereinafter, the flow of processes in this case will be described while also referencing FIG. 6. To avoid complexity in the following description, the summary windows 200, 300, and 400 are collectively referred to as the "summary window 200 or the like".

(7: Summary Display Operation) Suppose that a user (for example, the staff member or the department head) gives an instruction for displaying the summary window 200 or the like (S40).

(8: Display Request) The icon display module 20 detects the instruction for displaying the summary window 200 or the like and requests the summary window display module 22 to display the summary window 200 or the like (S42).

(9: information Acquisition) The summary window display module 22 acquires the file list and the aggregate result recorded in the file information recording area 14 of the shared folder 10 (S44).

(10: Information Acquisition) Also, the summary window display module 22 acquires the summary window display settings 26 from the user folder 24 in the terminal (S46).

Thereafter, the summary window display module 22 uses the information acquired in S44 and S46 to deploy the summary window 200 or the like on the screen (S48). After that, the process proceeds to S50 of FIG. 11.

FIG. 11 is an example of a procedure for generating the display inside the summary window 200 or the like deployed in S48.

In this procedure, the summary window display module 22 sets a plain rectangular background as a background illustration, and sets icons in a shape resembling a paper document (see FIG. 4) as icons representing files (S50). Next, the summary window display module 22 determines whether the display layout of the summary window in the summary window display settings 26 acquired in S46 is a "tree" (see FIG. 2) (S52). If the determination result is Yes, the summary window display module 22 sets a picture of a tree as a background illustration and sets icons in the shape of a fruit as icons representing files (S54). In other words, the background illustration and icons set in S50 are updated in S54.

If the determination result in S52 is No, the summary window display module 22 determines whether the display layout of the summary window in the summary window display settings 26 is a "road" (see FIG. 3) (S56). If the determination result is Yes, the summary window display module 22 sets a picture of a road as a background illustration and sets icons in the shape of a car as icons representing files (S58).

If the determination result in S56 is No, the display layout and file icon settings have the simple appearance with a plain background set in S50.

After the setting of the background illustration and file icons from S50 to S56 is completed, the summary window display module 22 next determines whether the setting for the sorting method in the summary window display settings 26 is by storage date (S60). If the determination result is Yes, the summary window display module 22 sorts the file list acquired in S44 by storage date from oldest to newest (S62).

On the other hand, if the determination result in S60 is No, the summary window display module 22 calculates the number of elapsed days since the last operation for each file in the file list (S64). In this step, for example, the most recent date and time from among the storage date and time, open date and time, and update date and time of each file in the file list is specified, and the number of days that have elapsed from the specified date and time up to the present is calculated. Thereafter, the summary window display module 22 sorts the file list by the number of elapsed days from most to least (S66).

Note that the procedure in FIG. 11 is an example for the case where the two methods illustrated in the fields 320 and 420 in FIGS. 3 and 4 are selectable as the sorting method.

Next, the summary window display module 22 displays the background illustration set in S50, S54, or S58 inside the summary window 200 or the like deployed in S44 (S68).

Next, the summary window display module 22 checks the setting in the summary window display settings 26 that indicates whether or not files in the "unopened" state are to be displayed (S70). As a result, if the setting indicates that files in the "unopened" state are to be displayed, the summary window display module 22 displays the icons 210*a*, 310*a*, or 410*c* representing files in the "unopened" state arranged from top to bottom according to the order of the files in the sorted file list (S72). At this time, the icons 210*a* or the like are arranged in a vertical column at a position corresponding to the "unopened" state in the background illustration. Also, the picture (in this example, a fruit, a car, or a paper document) of the icons 210*a* or the like is the picture that was set in S50, S54, or S58. Also, the appearance (for example, the color) of the icons 210*a* or the like is set to an appearance corresponding to the "unopened" state.

After the process in S72, or in the case of determining in S70 that the setting indicates that "unopened" files are not to be displayed, the summary window display module 22 next checks the setting in the summary window display settings 26 that indicates whether files in the "opened" state are to be displayed (S74). As a result, if the setting indicates that files in the "opened" state are to be displayed, the summary window display module 22 displays the icons 210*b*, 310*b*, or 410*b* representing files in the "opened" state arranged from top to bottom according to the order of the files in the sorted file list (S76). The specific process for displaying is similar to the one described above in relation to S72. The picture of the icons 210*b* or the like to be displayed obeys the summary window display settings 26, and the appearance (for example, the color) of the icons 210*b* or the like corresponds to the "opened" state.

After the process in S76, or in the case of determining in S74 that the setting indicates that "opened" files are not to be displayed, the summary window display module 22 next checks the setting in the summary window display settings 26 that indicates whether files the "updated" state are to be displayed (S78). As a result, if the setting indicates that files in the "updated" state are to be displayed, the summary window display module 22 displays the icons 210*c*, 310*c*, or 410*c* representing files in the "updated" state arranged from top to bottom according to the order of the files in the sorted file list (S60). The specific process for displaying is similar to the one described above in relation to S72. The picture of the icons 210*c* or the like to be displayed obeys the summary window display settings 26, and the appearance (for example, the color) of the icons 210*c* or the like corresponds to the "updated" state.

After the processes from S70 to S80, the summary window display module 22 displays the field 320 or the like for setting the sorting method and the field 330 or the like for setting the displayed files below the background illustration inside the summary window 200 or the like. This concludes the series of processes in the case where an instruction for displaying the summary window is given.

As described above, in the exemplary embodiment, the overlay icons 110 indicating the numbers of files in each of multiple states are displayed in association with the tray icon 100. With this arrangement, the user able to grasp the number of files in each state in the shared folder 10, without having to click the tray icon 100 or the like to open the shared folder 10.

Also, through the summary window 200, 300, or 400 provided by the system according to the exemplary embodiment, the user is able to grasp a distribution of the states and a temporal attribute of the files in the shared folder 10.

The file states in the above example, namely "unopened", "opened", and "updated", are merely an illustrative example. The method according to the exemplary embodiment is generally applicable to a workflow that progresses as a result of data being stored in a folder and some kind of operation (such as viewing or editing, for example) being performed on the data in the folder. The system according to the exemplary embodiment displays overlay icons respectively corresponding to each state indicating the stage of progress of the data in the workflow, the overlay icons being attached to an icon that represents the folder on the screen. In each overlay icon, the number of pieces of data in the corresponding state, or in other words the corresponding stage of progress, from among the data in the folder is displayed.

Also, in the summary windows 200, 300, and 400 illustrated as examples in FIGS. 2 to 4, the horizontal axis is used to indicate the progress of the file states and the vertical axis is used to indicate the values of a temporal attribute of the files, but obviously the axes may also be reversed.

Figure 12:
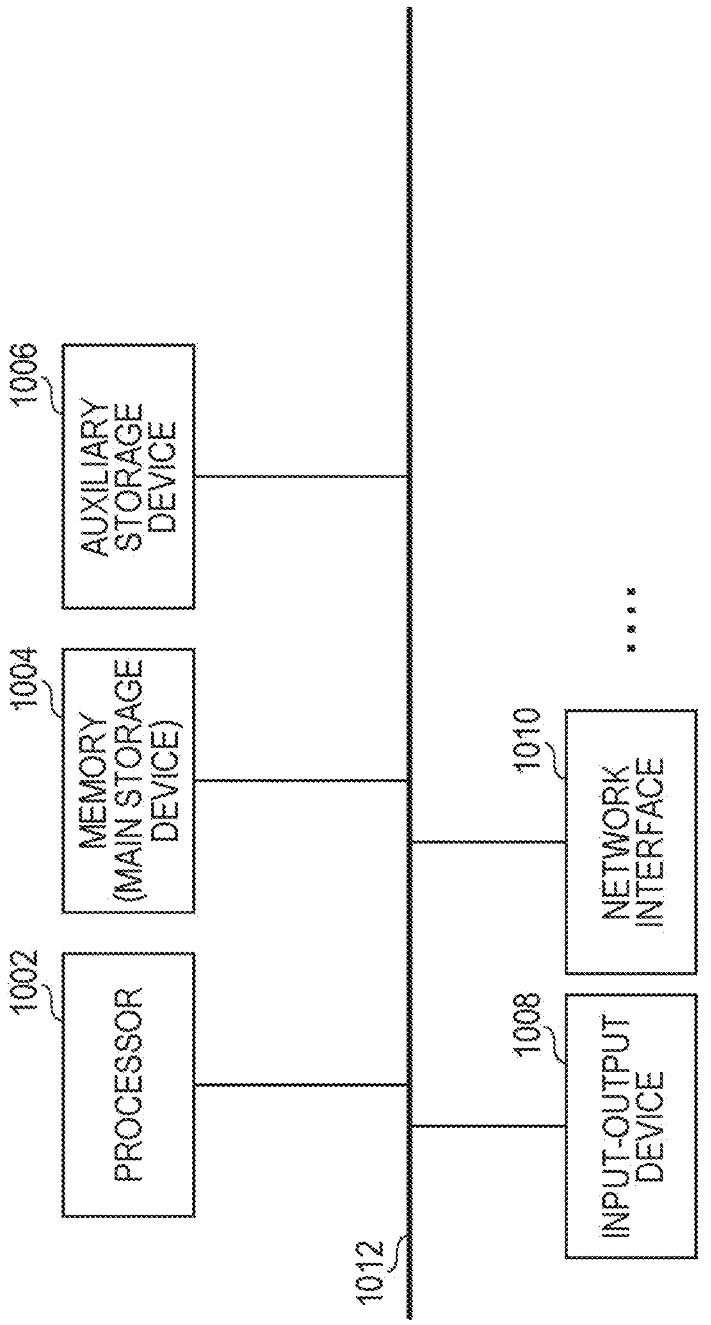
FIG. 12 is a diagram illustrating an example of a hardware configuration of a general-purpose computer.

The server-side device and the user-side terminal forming the system according to the exemplary embodiment are configured using a general-purpose computer, for example. As illustrated in FIG. 12, for example, the computer has a circuit configuration in which a processor 1002, a memory (main storage device) 1004 such as random access memory (RAM), a controller that controls an auxiliary storage device 1006 which is a non-volatile storage device such as flash memory, a solid-state drive (SSD), or a hard disk drive (HDD), an interface with any of various types of input and output devices 1008, a network interface 1010 that controls connections with a network such as a local area network, and the like are connected via a data transmission channel such as a bus 1012. A program that describes the content of the processes according to the exemplary embodiment is installed in the computer over the network or the like and stored in the auxiliary storage device 1006. By having the processor 1002 execute the program stored in the auxiliary storage device 1006 using the memory 1004, the server-side device and the terminal according to the exemplary embodiment are achieved.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising a processor configured to:

calculate a number of pieces of data in each of a plurality of states that the data may take from among data stored in a storage location; and execute a process for displaying the calculated number of pieces of data in each state in association with a representative image that represents the storage location, wherein the processor is configured to further execute, in response to an operation from a user, a process for displaying a summary window in which representative images respectively representing each piece of data stored in the storage location are classified and arranged according to the state, and in the summary window, the representative images respectively representing each piece of data are arranged in a coordinate system in which the plurality of states are assigned to respective positions on a first axis and values of a temporal attribute of the data are assigned to respective positions on a second axis that is perpendicular to the first axis, wherein the second axis is a vertical axis of the summary window, and the values of the temporal attribute of the data are arranged along the vertical axis such that a file arranged at a higher position along the vertical axis has an older storage date or a longer elapsed time than a file arranged at a lower position along the vertical axis, wherein the temporal attribute of the data, which is displayed in the summary window is switchable in response to a user operation between (i) storage date when the data was first stored in the storage location and (ii) an elapsed time since the data changed to a current state of the data.

2. The information processing device according to claim 1, wherein the processor is configured to execute, in response to an operation or setting from the user, a process for switching between displaying the summary window and displaying a window indicating a list of the data in the storage location provided by an operating system of the information processing device.

3. The information processing device according to claim 1, wherein the current state is a state indicating a current progress of a workflow related to the data.

4. The information processing device according to claim 2, wherein the current state is a state indicating a current progress of a workflow related to the data.

5. An information processing method comprising:

calculating a number of pieces of data in each of a plurality of states that the data may take from among data stored in a storage location; and executing a process for displaying the calculated number of pieces of data in each state in association with a representative image that represents the storage location, wherein the method further comprises executing, in response to an operation from a user, a process for displaying a summary window in which representative images respectively representing each piece of data stored in the storage location are classified and arranged according to the state, and in the summary window, the representative images respectively representing each piece of data are arranged in a coordinate system in which the plurality of states are assigned to respective positions on a first axis and values of a temporal attribute of the data are assigned to respective positions on a second axis that is perpendicular to the first axis, wherein the second axis is a vertical axis of the summary window, and the values of the temporal attribute of the data are arranged along the vertical axis such that a file arranged at a higher position along the vertical axis has an older storage date or a longer elapsed time than a file arranged at a lower position along the vertical axis, wherein the temporal attribute of the data, which is displayed in the summary window, is switchable in response to a user operation between (i) a storage date when the data was first stored in the storage location and (ii) an elapsed time since the data changed to a current state of the data.

6. The information processing method of claim 5, wherein the method further comprises, in response to an operation or setting from the user, switching between displaying the summary window and displaying a window indicating a list of the data in the storage location provided by an operating system of the information processing device.

7. The information processing method of claim 5, wherein the current state is a state indicating a current progress of a workflow related to the data.

8. A non-transitory computer readable medium storing a program causing a computer to execute a process comprising:

calculating a number of pieces of data in each of a plurality of states that the data may take from among data stored in a storage location; and executing a process for displaying the calculated number of pieces of data in each state in association with a representative image that represents the storage location, wherein the process further comprises executing, in response to an operation from a user, a process for displaying a summary window in which representative images respectively representing each piece of data stored in the storage location are classified and arranged according to the state, and in the summary window, the representative images respectively representing each piece of data are arranged in a coordinate system in which the plurality of states are assigned to respective positions on a first axis and values of a temporal attribute of the data are assigned to respective positions on a second axis that is perpendicular to the first axis, wherein the second axis is a vertical axis of the summary window, and the values of the temporal attribute of the data are arranged along the vertical axis such that a file arranged at a higher position along the vertical axis has an older storage date or a longer elapsed time than a file arranged at a lower position along the vertical axis, wherein the temporal attribute of the data, which is displayed in the summary window, is switchable in response to a user operation between (i) a storage date when the data was first stored in the storage location and (ii) an elapsed time since the data changed to a current state of the data.

9. The non-transitory computer readable medium of claim 8, wherein the process further comprises, in response to an operation or setting from the user, switching between displaying the summary window and displaying a window indicating a list of the data in the storage location provided by an operating system of the information processing device.

10. The non-transitory computer readable medium of claim 8, wherein the current state is a state indicating a current progress of a workflow related to the data.

* * * * *